US009754109B1

(12) United States Patent
Parker-Wood et al.

(10) Patent No.: US 9,754,109 B1
(45) Date of Patent: Sep. 5, 2017

(54) SYSTEMS AND METHODS FOR MANAGING ACCESS

(71) Applicant: Symantec Corporation, Mountain View, CA (US)

(72) Inventors: Aleatha Parker-Wood, Redwood City, CA (US); Michael Hart, Farmington, CT (US); Darren Shou, La Jolla, CA (US); Chetan Verma, Sunnyvale, CA (US)

(73) Assignee: Symantec Corporation, Mountain View, CA (US)

( * ) Notice: Subject to any disclaimer, the term of this patent is extended or adjusted under 35 U.S.C. 154(b) by 0 days.

(21) Appl. No.: 14/614,435

(22) Filed: Feb. 5, 2015

(51) Int. Cl.
| | |
|---|---|
| *G06F 21/57* | (2013.01) |
| *G06F 21/50* | (2013.01) |
| *G06F 21/62* | (2013.01) |
| *G06F 21/60* | (2013.01) |
| *H04L 29/06* | (2006.01) |

(52) U.S. Cl.
CPC .............. *G06F 21/57* (2013.01); *G06F 21/50* (2013.01); *G06F 21/6218* (2013.01); *G06F 21/60* (2013.01); *G06F 21/62* (2013.01); *G06F 2221/034* (2013.01); *H04L 63/10* (2013.01);
(Continued)

(58) Field of Classification Search
CPC ............. H04L 63/1425; H04L 63/1441; H04L 63/1458; H04L 63/083; H04L 63/10; H04L 63/102; H04L 63/105; H04L 63/107; G06F 21/30; G06F 21/316; G06F 21/44; G06F 21/50; G06F 21/55; G06F 21/552; G06F 21/554; G06F 21/566; G06F 21/567; G06F 21/57; G06F 2221/034; G06F 21/62; G06F 21/6218; G06F 21/60

See application file for complete search history.

(56) References Cited

U.S. PATENT DOCUMENTS 8,312,540 B1* 11/2012 Kahn et al. ........... G06F 21/552
 713/183
8,433,694 B1* 4/2013 Eldridge et al. ... G06F 17/30132
 707/705
(Continued)

OTHER PUBLICATIONS

"2 Introduction to Oracle Service Bus Administration", http://docs.oracle.com/middleware/1213/osb/administer/osbadminoverview.htm, as accessed Dec. 9, 2014, Oracle® Fusion Middleware Administering Oracle Service Bus, (On or before Dec. 9, 2014).
(Continued)

*Primary Examiner* — Morshed Mehedi
*Assistant Examiner* — Ayoub Alata
(74) *Attorney, Agent, or Firm* — FisherBroyles LLP

(57) ABSTRACT

A computer-implemented method for managing access may include (1) identifying an attempt to perform, within a computing environment, an action that involves a specific entity, (2) determining that the attempted action is anomalous for the specific entity, (3) identifying a quota of allowed anomalous actions for the specific entity, (4) determining that the attempted action causes a count of anomalous actions to exceed the quota of allowed anomalous actions, and (5) performing a security action based on the determination that the attempted action causes the count of anomalous actions to exceed the quota of allowed anomalous actions. Various other methods, systems, and computer-readable media are also disclosed.

20 Claims, 7 Drawing Sheets

(52) U.S. Cl.
CPC .......... *H04L 63/102* (2013.01); *H04L 63/105* (2013.01); *H04L 63/107* (2013.01)

(56) References Cited

U.S. PATENT DOCUMENTS

| | | | | |
|---|---|---|---|---|
| 2014/0082715 | A1* | 3/2014 | Grajek et al. ....... | H04L 63/0815 726/8 |
| 2015/0052614 | A1* | 2/2015 | Crowell et al. ....... | G06F 21/566 726/25 |
| 2015/0180976 | A1* | 6/2015 | Xiao et al. .............. | H04L 67/12 709/203 |

OTHER PUBLICATIONS

"EWS throttling in Exchange", https://msdn.microsoft.com/en-us/enus/library/office/jj945066(v=exchg.150).aspx, as accessed Dec. 9, 2014, Microsoft, (Jun. 23, 2014).

Cook, Jim et al., "Security Guide for IBM i V6.1", http://books.google.com/books?id=XLy6AgAAQBAJ&pg=PA195&lpg=PA195&dq=statistical+security+rate+throttling&source=bl&ots=toMENVoJBY&sig=p463H7Agv8PgMjqDzL__ie8zGGU&hl=en&sa=X&ei=5xciVIOZDssogTqnYCgBA&ved=0CB0Q6AEwADgK#v=onepage&q=statistical%20security%20rate, as accessed Dec. 9, 2014, vol. 61, IBM Redbooks, (May 2009).

Haeberlen, Andreas "CIS 700/003—Distributed Systems meet Social Networks", http://www.cis.upenn.edu/~ahae/teaching/cis700s10/slides/differential_privacy.pdf, as accessed Dec. 9, 2014, (On or before Jan. 14, 2010).

McSherry, Frank "Privacy Integrated Queries—An Extensible Platform for Privacy-Preserving Data Analysis", http://research.microsoft.com/pubs/80218/sigmod115mcsherry.pdf, as accessed Dec. 9, 2014, SIGMOD'09, Providence, Rhode Island, (Jun. 29-Jul. 2, 2009).

"ModelDecayFunctions", https://code.google.com/p/openmalaria/wiki/ModelDecayFunctions, as accessed Dec. 9, 2014, (Feb. 4, 2013).

"Configuring OSPF", http://www.cisco.com/c/en/us/td/docs/ios-xml/ios/iproute_ospf/configuration/12-4t/iro-12-4t-book/iro-cfg.html, as accessed Dec. 9, 2014, IP Routing: OSPF Configuration Guide, Cisco IOS Release 12.4T, Cisco, (Dec. 18, 2013).

"OSPF Design Guide", http://www.cisco.com/c/en/us/support/docs/ip/open-shortest-path-first-ospf/7039-1.html, as accessed Dec. 9, 2014, Document ID:7039, Cisco, (Aug. 10, 2005).

"OSPF Shortest Path First Throttling", http://www.cisco.com/c/en/us/td/docs/ios/12_2s/feature/guide/fs_spftrl.html, as accessed Dec. 9, 2014, Cisco IOS Software Releases 12.2 S, Cisco, (Sep. 15, 2014).

* cited by examiner

SYSTEMS AND METHODS FOR MANAGING ACCESS

BACKGROUND

Individuals and organizations typically seek to protect their data from unauthorized access and release. Failure to properly protect data can result in major legal and financial losses for companies. Accordingly, these companies may set up traditional security and data loss prevention policies. These traditional policies may include access group restrictions and strictly defined firewalls.

Unfortunately, traditional security and data loss prevention policies may often inconvenience the end user. Accordingly, users will often circumvent these policies to avoid the associated inconvenience. Similarly, administrators will often setup the policies using lax settings and data controls to avoid inconveniencing users and to enable productivity of employees.

Moreover, these traditional security and data loss prevention policies may also place large burdens on security administrators. For example, the administrators may configure access groups, configure firewall rules and settings, and/or add or remove groups from network locations and services. These manual actions may place a heavy burden on the time and labor resources of security administrators. Accordingly, the instant disclosure identifies and addresses a need for additional and improved systems and methods for managing access.

SUMMARY

As will be described in greater detail below, the instant disclosure generally relates to systems and methods for managing access by, for example, using a quota of allowed anomalous actions to determine whether an attempted action should be allowed, blocked, and/or otherwise inhibited. In one example, a computer-implemented method for managing access may include (1) identifying an attempt to perform, within a computing environment, at least one action that involves a specific entity, (2) determining that the attempted action is anomalous for the specific entity, (3) identifying a quota of allowed anomalous actions for the specific entity, (4) determining that the attempted action causes a count of anomalous actions to exceed the quota of allowed anomalous actions, and (5) performing at least one security action based on the determination that the attempted action causes the count of anomalous actions to exceed the quota of allowed anomalous actions.

In one embodiment, the specific entity may include a user and/or a network device. In a further embodiment, the quota specifies a number of allowed anomalous actions over a period of time. In one embodiment, the period of time may be defined in terms of a time of requesting to perform the action. In another example, the period of time may end at a time of requesting to perform the action.

In one embodiment, the quota is assigned to the specific entity based on a level of trust for the specific entity. In some examples, determining that the attempted action is anomalous for the specific entity may include calculating a degree to which the attempted action is estimated to be anomalous. In further examples, determining that the attempted action is anomalous for the specific entity may further include determining that the calculated degree satisfies a threshold.

In some examples, determining that the attempted action is anomalous for the specific entity may be based on a statistical measure of past behavior by the specific entity. Similarly, determining that the attempted action is anomalous for the specific entity may be based on a statistical measure of past behavior by another specific entity that is compared to the specific entity.

In one embodiment, the quota of allowed anomalous actions may include a global quota that applies to an entire set of specific entities. In another embodiment, the computer-implemented method may further include determining that an additional attempted action is not anomalous for the specific entity. The computer-implemented method may also include allowing the additional attempted action to be performed while continuing to perform security actions in response to attempts to perform anomalous actions that cause the count of anomalous actions to exceed the quota.

In one example, the security action may include (1) blocking the attempted action, (2) network throttling, (3) revocation of access privileges, and/or (4) issuing a report to an administrator. Moreover, the computer-implemented method may further include modifying the count by transferring credits.

In one embodiment, the quota specifies a number of allowed anomalous actions for a specific category of actions and an additional quota is assigned to the specific entity for a different category of actions. In another embodiment, the count of anomalous actions may be based on the application of a decay function applied to a previous anomalous action.

In one embodiment, a system for implementing the above-described method may include (1) an identification module, stored in memory, that identifies an attempt to perform, within a computing environment, at least one action that involves a specific entity and (2) a determination module, stored in memory, that determines that the attempted action is anomalous for the specific entity. The identification module may further identify a quota of allowed anomalous actions for the specific entity. The determination module may further determine that the attempted action causes a count of anomalous actions to exceed the quota of allowed anomalous actions. The system may also include (3) a performance module, stored in memory, that performs at least one security action based on the determination that the attempted action causes the count of anomalous actions to exceed the quota of allowed anomalous actions and (4) at least one physical processor configured to execute the identification module, the determination module, and the performance module.

In some examples, the above-described method may be encoded as computer-readable instructions on a non-transitory computer-readable medium. For example, a computer-readable medium may include one or more computer-executable instructions that, when executed by at least one processor of a computing device, may cause the computing device to (1) identify an attempt to perform, within a computing environment, at least one action that involves a specific entity, (2) determine that the attempted action is anomalous for the specific entity, (3) identify a quota of allowed anomalous actions for the specific entity, (4) determine that the attempted action causes a count of anomalous actions to exceed the quota of allowed anomalous actions, and (5) perform at least one security action based on the determination that the attempted action causes the count of anomalous actions to exceed the quota of allowed anomalous actions.

Features from any of the above-mentioned embodiments may be used in combination with one another in accordance with the general principles described herein. These and other embodiments, features, and advantages will be more fully understood upon reading the following detailed description in conjunction with the accompanying drawings and claims.

BRIEF DESCRIPTION OF THE DRAWINGS

The accompanying drawings illustrate a number of exemplary embodiments and are a part of the specification. Together with the following description, these drawings demonstrate and explain various principles of the instant disclosure.

Figure 1:
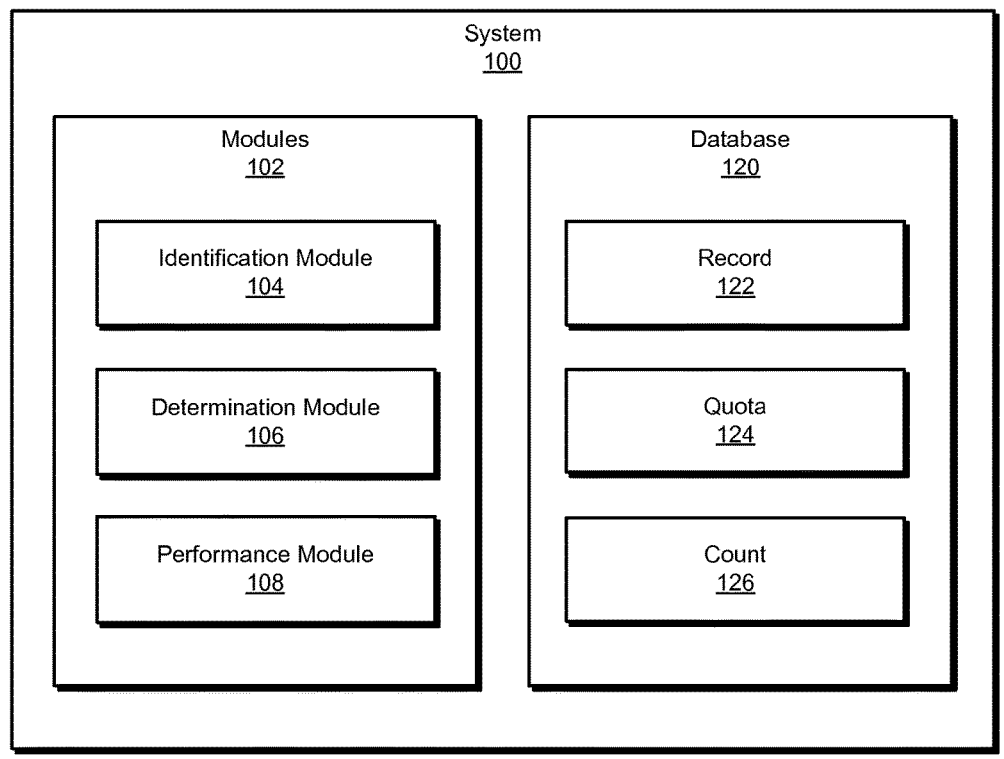
FIG. 1 is a block diagram of an exemplary system for managing access.

Throughout the drawings, identical reference characters and descriptions indicate similar, but not necessarily identical, elements. While the exemplary embodiments described herein are susceptible to various modifications and alternative forms, specific embodiments have been shown by way of example in the drawings and will be described in detail herein. However, the exemplary embodiments described herein are not intended to be limited to the particular forms disclosed. Rather, the instant disclosure covers all modifications, equivalents, and alternatives falling within the scope of the appended claims.

DETAILED DESCRIPTION OF EXEMPLARY EMBODIMENTS

The present disclosure is generally directed to systems and methods for managing access. As will be explained in greater detail below, the disclosed systems and methods may enable a security system to adapt to user behavior gracefully over time, without relying on rigid manual settings and configurations. Similarly, the disclosed systems and methods may help alleviate the burden on administrators in setting up, and managing, security and data loss prevention policies.

Figure 2:
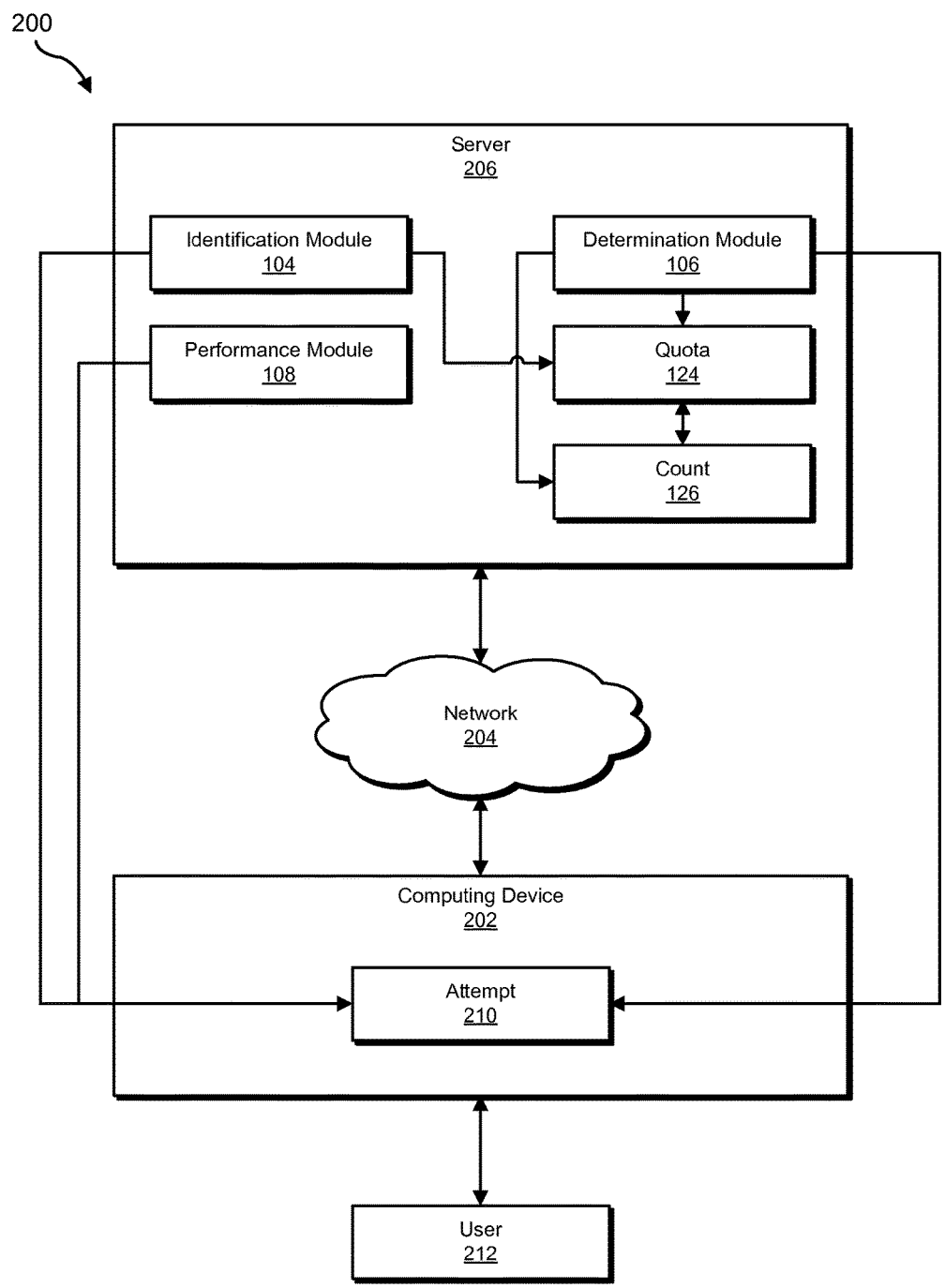
FIG. 2 is a block diagram of an additional exemplary system for managing access.

The following will provide, with reference to FIGS. 1-2, detailed descriptions of exemplary systems for managing access. Detailed descriptions of corresponding computer-implemented methods will also be provided in connection with FIGS. 3-5. In addition, detailed descriptions of an exemplary computing system and network architecture capable of implementing one or more of the embodiments described herein will be provided in connection with FIGS. 6 and 7, respectively.

FIG. 1 is a block diagram of exemplary system 100 for managing access. As illustrated in this figure, exemplary system 100 may include one or more modules 102 for performing one or more tasks. For example, and as will be explained in greater detail below, exemplary system 100 may also include an identification module 104 that may identify an attempt to perform, within a computing environment, at least one action that involves a specific entity. Exemplary system 100 may additionally include a determination module 106 that may determine that the attempted action is anomalous for the specific entity. Identification module 104 may also identify a quota of allowed anomalous actions for the specific entity. Determination module 106 may further determine that the attempted action causes a count of anomalous actions to exceed the quota of allowed anomalous actions. Exemplary system 100 may also include a performance module 108 that may perform at least one security action based on the determination that the attempted action causes the count of anomalous actions to exceed the quota of allowed anomalous actions. Although illustrated as separate elements, one or more of modules 102 in FIG. 1 may represent portions of a single module or application.

In certain embodiments, one or more of modules 102 in FIG. 1 may represent one or more software applications or programs that, when executed by a computing device, may cause the computing device to perform one or more tasks. For example, and as will be described in greater detail below, one or more of modules 102 may represent software modules stored and configured to run on one or more computing devices, such as the devices illustrated in FIG. 2 (e.g., computing device 202 and/or server 206), computing system 610 in FIG. 6, and/or portions of exemplary network architecture 700 in FIG. 7. One or more of modules 102 in FIG. 1 may also represent all or portions of one or more special-purpose computers configured to perform one or more tasks.

As illustrated in FIG. 1, exemplary system 100 may also include one or more databases, such as database 120. In one example, database 120 may be configured to store a record 122, which may record previous behavior and activity by an end user and/or a network device, as discussed further below. Database 120 may also be configured to store a quota 124 of allowed anomalous actions. Similarly, database 120 may also be configured to store a count 126 of anomalous actions. As mentioned above, and as discussed further below, determination module 106 may compare count 126 with quota 124 to determine whether performance module 108 should perform a security action.

Database 120 may represent portions of a single database or computing device or a plurality of databases or computing devices. For example, database 120 may represent a portion of server 206 in FIG. 2, computing system 610 in FIG. 6, and/or portions of exemplary network architecture 700 in FIG. 7. Alternatively, database 120 in FIG. 1 may represent one or more physically separate devices capable of being accessed by a computing device, such as server 206 in FIG. 2, computing system 610 in FIG. 6, and/or portions of exemplary network architecture 700 in FIG. 7.

Exemplary system 100 in FIG. 1 may be implemented in a variety of ways. For example, all or a portion of exemplary system 100 may represent portions of exemplary system 200 in FIG. 2. As shown in FIG. 2, system 200 may include a computing device 202 in communication with a server 206 via a network 204. In one example, computing device 202 may be programmed with one or more of modules 102 and/or may store all or a portion of the data in database 120. Additionally or alternatively, server 206 may be programmed with one or more of modules 102 and/or may store all or a portion of the data in database 120.

In one embodiment, one or more of modules 102 from FIG. 1 may, when executed by at least one processor of computing device 202 and/or server 206, enable computing device 202 and/or server 206 to manage access of computing resources. For example, and as will be described in greater detail below, identification module 104 may identify an attempt 210 to perform, within a computing environment, at least one action that involves a specific entity, such as a user 212. Determination module 106 may determine that the attempted action is anomalous for user 212. Identification module 104 may identify quota 124 of allowed anomalous actions for user 212. Determination module 106 may determine that the attempted action causes count 126 of anomalous actions to exceed quota 124 of allowed anomalous actions. Performance module 108 may perform at least one security action based on the determination that the attempted action causes count 126 of anomalous actions to exceed quota 124 of allowed anomalous actions.

In the example of FIG. 2, modules 102 may be located server-side. Modules 102 may then monitor and manage attempts to access computing resources at client computing devices, such as computing device 202. For example, modules 102 may monitor and manage attempt 210 that occurs at computing device 202. In other examples, however, any mix or permutation of modules 102 may be located client-side at computing device 202. Moreover, in some examples, all of modules 102 may be located within the same server or client computing system while monitoring and managing attempts to access computing resources at the same computing system, without reference to other network devices.

Computing device 202 generally represents any type or form of computing device capable of reading computer-executable instructions. Examples of computing device 202 include, without limitation, laptops, tablets, desktops, servers, cellular phones, Personal Digital Assistants (PDAs), multimedia players, embedded systems, wearable devices (e.g., smart watches, smart glasses, etc.), gaming consoles, combinations of one or more of the same, exemplary computing system 610 in FIG. 6, or any other suitable computing device.

Server 206 generally represents any type or form of computing device that is capable of implementing a security system or data loss prevention policy, such as by comparing a count of anomalous actions with a quota of allowed anomalous actions, as discussed below. Examples of server 206 include, without limitation, application servers and database servers configured to provide various database services and/or run certain software applications.

Network 204 generally represents any medium or architecture capable of facilitating communication or data transfer. Examples of network 204 include, without limitation, an intranet, a Wide Area Network (WAN), a Local Area Network (LAN), a Personal Area Network (PAN), the Internet, Power Line Communications (PLC), a cellular network (e.g., a Global System for Mobile Communications (GSM) network), exemplary network architecture 700 in FIG. 7, or the like. Network 204 may facilitate communication or data transfer using wireless or wired connections. In one embodiment, network 204 may facilitate communication between computing device 202 and server 206.

Figure 3:
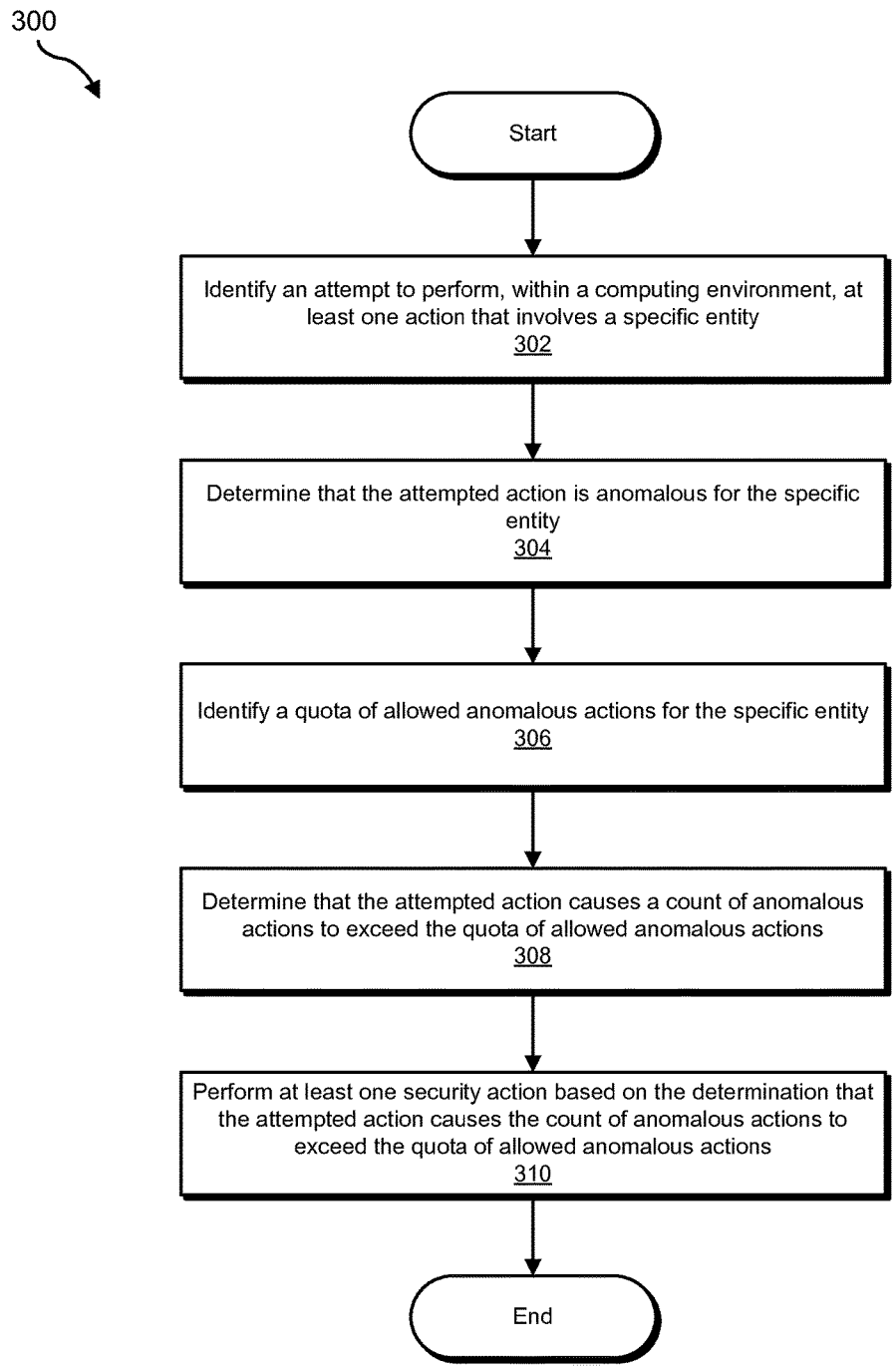
FIG. 3 is a flow diagram of an exemplary method for managing access.

FIG. 3 is a flow diagram of an exemplary computer-implemented method 300 for managing access. The steps shown in FIG. 3 may be performed by any suitable computer-executable code and/or computing system. In some embodiments, the steps shown in FIG. 3 may be performed by one or more of the components of system 100 in FIG. 1, system 200 in FIG. 2, computing system 610 in FIG. 6, and/or portions of exemplary network architecture 700 in FIG. 7.

As illustrated in FIG. 3, at step 302, one or more of the systems described herein may identify an attempt to perform, within a computing environment, at least one action that involves a specific entity. For example, identification module 104 may, as part of server 206 in FIG. 2, identify attempt 210 to perform, within a computing environment, at least one action that involves user 212.

As used herein, the term "action" generally refers to any action, command, and/or request that may be made (e.g., by a user or network device) in a computing environment. Some typical actions may include accessing a file, transmitting a network packet, and/or outputting data to an external device. Similarly, as used herein, the term "specific entity" generally refers to any entity, such as a user and/or computing device, that may attempt to perform an action within a computing environment. In some examples, users may attempt to perform actions with respect to a computing device, such as by attempting to access a file on a laptop, attempting to print a document to a printer, and/or attempting to display an image on a monitor. In other examples, computing or network devices may attempt to perform actions autonomously or semi-autonomously without users manually requesting those actions. For example, a network router may attempt to forward a network packet issued by an autonomous software application. As discussed further below, quotas may be assigned to any permutation of users, devices, and/or other parameters. For example, additional parameters may specify that a quota only applies to specific periods of time, specific protected files, and/or specific categories of action.

Identification module 104 may identify the attempt to perform the action in a variety of ways. In some examples, identification module 104 may intercept the attempt to perform the action. For example, the computing environment may be configured such that attempts to perform specified actions are monitored, intercepted, and/or evaluated by identification module 104. Moreover, identification module 104 may have different monitors set up to monitor for different kinds or categories of attempted actions, as further discussed below. For example, a filter driver may intercept the attempt to perform the action. In similar examples, a security agent may be installed on the computing system (e.g., computing device 202) that monitors, intercepts, reports, and/or evaluates attempts to perform specified actions. Similarly, a security agent may be installed on a server, proxy, switch, and/or router that monitors, intercepts, reports, and/or evaluates network traffic that indicates an attempt to perform specified actions. In further examples, the security agent and/or identification module 104 may interface with (e.g., be coupled with, included within, and/or installed within) the operating system, file system, and/or kernel to identify attempts to perform specified actions, including accessing files, accessing network resources, accessing peripheral devices, and/or accessing operating system or CPU resources.

At step 304, one or more of the systems described herein may determine that the attempted action is anomalous for the specific entity. For example, determination module 106 may, as part of server 206 in FIG. 2, determine that the attempted action is anomalous for the specific entity. As used herein, the term "anomalous" generally refers to actions that satisfy a statistical, analyzed, and/or predicted measure (e.g., threshold level) of abnormality or deviation from a statistical, expected, and/or predicted baseline or normal level.

Determination module 106 may determine that the attempted action is anomalous in a variety of ways. In some examples, determination module 106 may determine that the attempted action is anomalous for the specific entity by calculating a degree to which the attempted action is estimated to be anomalous. In further examples, determination module 106 may determine that the attempted action is anomalous for the specific entity further by determining that the calculated degree satisfies a threshold. For example, determination module 106 may establish or define a level of deviation (e.g., standard deviation) that functions as a threshold for categorizing actions as either routine or anomalous.

In some examples, determination module 106 may establish upper and/or lower bounds as defining a normal range for any first-order, second-order, and/or n-order value. These values may include counts (e.g., counts of attempts to access a specific set of files or resources, counts of login attempts, counts of different network devices, and/or counts of commands issued to one or more network or peripheral devices), times of day, days of the week, calendar days, and/or second-order measures of these (e.g., rates in terms of time). Determination module 106 may base upper and/or lower bounds on manual settings, administrator settings, predefined values, default values, a statistical analysis of previous behavior by the specific entity, and/or a statistical analysis of previous behavior by one or more other entities (e.g., other entities that are comparable to the specific entity, such as other network devices having the same category, type, brand, and/or functionality, and such as other users having the same or similar role within an organization, level of administrative privilege, location, and/or office).

At step 306, one or more of the systems described herein may identify a quota of allowed anomalous actions for the specific entity. For example, identification module 104 may, as part of server 206 in FIG. 2, identify quota 124 of allowed anomalous actions for the specific entity.

As used herein, the term "quota" generally refers to an integer, decimal, and/or other value that defines a count, measure, or amount of allowed anomalous actions. As discussed further below, the systems and methods herein may apply mathematical functions (e.g., decay functions) that may result in partial or fractional attempts being included within the account and/or quota (e.g., a quota of 3.4 allowed anomalous actions).

Identification module 104 may identify the quota of allowed anomalous actions in a variety of ways. In one embodiment, the quota may be assigned to the specific entity based on a level of trust for the specific entity. Moreover, the level of trust may be assigned to the specific entity based on (1) previous behavior of the specific entity, (2) a tenure of the specific entity, (3) a statistical analysis of previous actions taken by the specific entity, (4) a rank of the specific entity within an organization, (5) a number or ratio of known trustworthy or known untrustworthy actions previously performed by the specific entity, and/or (6) a level of privilege previously assigned to the specific entity within a security system). In other examples, the level of trust may constitute a default or preliminary value (e.g., for a new employee).

In one embodiment, the quota specifies a number of allowed anomalous actions over a period of time. The period of time may be open-ended at the beginning and/or end. One or both endpoints of the period of time may be defined as fixed and unchanging (e.g., a specific calendar date and year) or dynamic and rolling (e.g., the end of the period of time may be defined in terms of a time of attempt 210 to perform the action, as discussed above). For example, in one embodiment, the period of time may end at a time of requesting to perform the action. In more specific examples, the period of time may refer to a previous week, month, and/or year or any other previous period of time. More generally, one or both endpoints may be defined in terms of variables or events (e.g., attempts to perform actions) that may dynamically change over time. In other words, one endpoint may refer to whenever an attempt to perform an action occurs, rather than a predetermined and fixed point in time on the calendar year.

Figure 4:
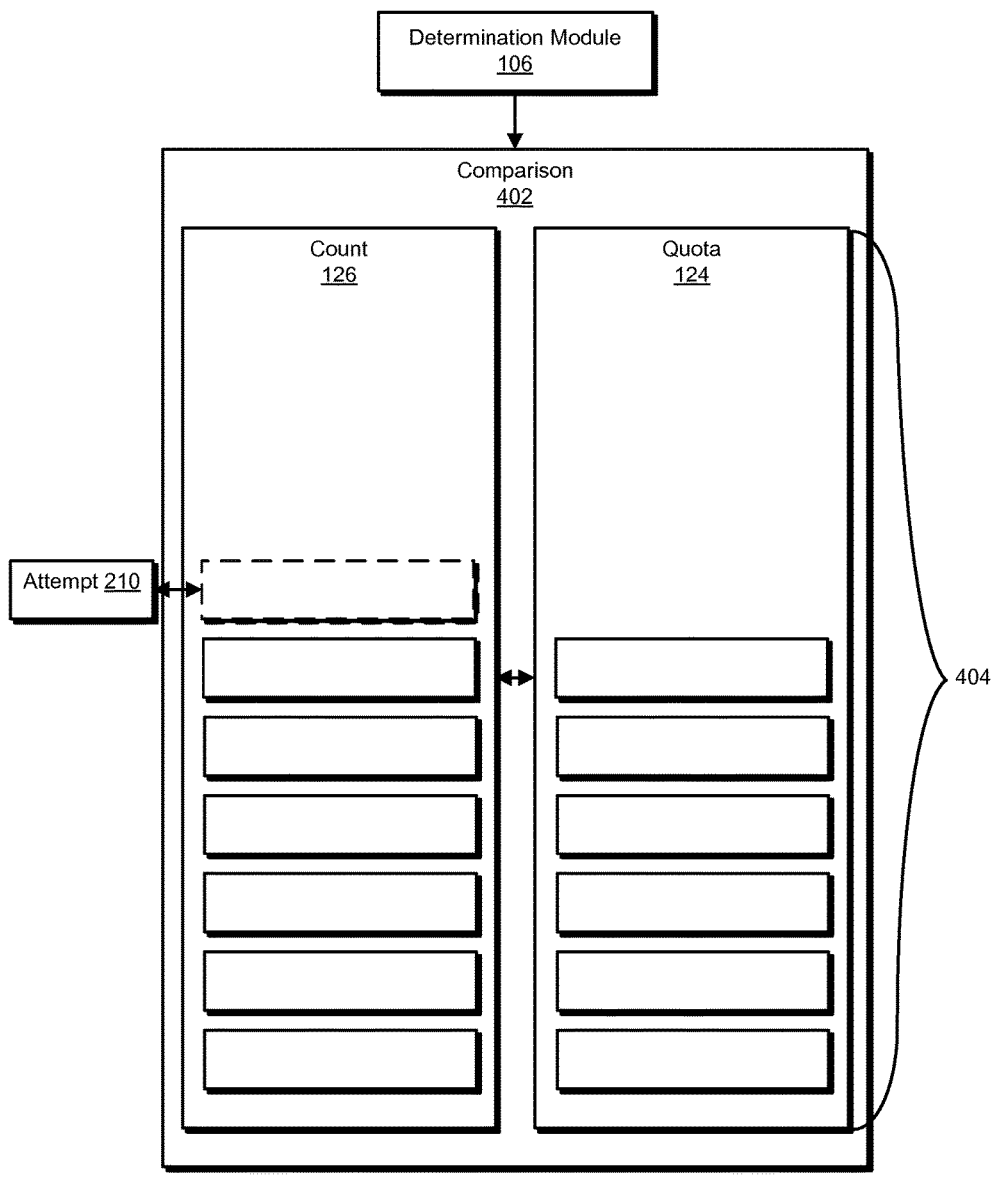
FIG. 4 is a block diagram of an exemplary comparison between a count of anomalous actions and a quota of allowed anomalous actions.

FIG. 4 shows an exemplary comparison 402 between count 126 and quota 124. As shown in FIG. 4, quota 124 may specify a quota or limit of six anomalous actions that may be performed by the specific entity. Moreover, quota 124 may only apply to a specific period of time, which may be represented by the brackets and numeral 404 shown in FIG. 4.

Figure 5:
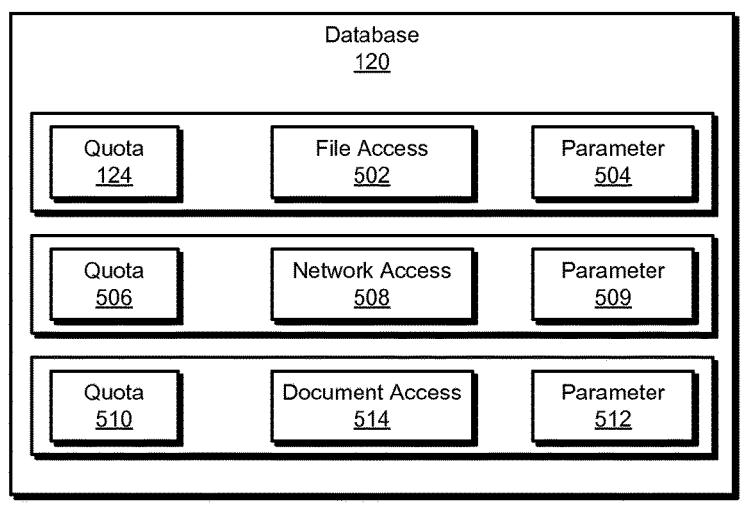
FIG. 5 is a block diagram of an exemplary database that may store quotas that are associated with varying parameters.

Similarly, FIG. 5 shows an example of database 120. In this specific example, database 120 may include three different quotas, quota 124, a quota 506, and a quota 510. As further shown in FIG. 5, each of these three quotas may further be associated with one or more parameters. In the specific example of FIG. 5, each quota is associated with a specific parameter and also a general, unspecified parameter. In particular, quota 124 is associated with a category of action, namely file access 502; quota 506 is associated with another category of action, namely network access 508; and quota 510 is associated with another category of action, namely document access 514. Similarly, each quota is associated with another general, unspecified parameter, which corresponds to parameter 504, 509, and 512, respectively. In the example of FIG. 5, each quota is associated with two other parameters, but in other examples quotas may be associated with any number or permutation of parameters. For example, other parameters (which may correspond to any of parameter 504, parameter 509, and parameter 512) may include (1) the user(s) or network device(s) limited by the quota, (2) a period of time or dates during which the quota applies, (3) one or more security actions to be performed when the quota is exceeded, (4) a period of time or dates during which a count is accumulated for comparison with the quota (as discussed above), and/or (5) a physical location where the quota applies. Any other suitable parameter that defines a condition or limitation on applicability of the quota may be associated with the quota as well. Notably, two or more quotas, such as any two or more of the quotas shown in FIG. 5, may apply to the same specific entity, which may refer to the same single user or computing device, or, alternatively, instead refer to any set or permutation of multiple users and/or computing devices. In other words, the quota (e.g., quota 124) may specify a number of allowed anomalous actions for a specific category of actions, and an additional quota (e.g., quota 506) may be assigned to the specific entity for a different category of actions.

In other embodiments, the quota of allowed anomalous actions may include a global quota that applies to an entire set of specific entities. For example, every user within a set of users, or every employee within a group within an organization, may be limited by the same quota. Similarly, the quota may apply to a set of network devices. Moreover, the quota may apply to any permutation or combination of users and network devices. In any of these examples, different members of a set may all have their own individual and independent counts, while all sharing the same quota. Alternatively, actions performed by different members of a set may all increment the same count. Moreover, in additional embodiments, identification module 104 and/or another module may modify the count and/or the quota by transferring credits from one specific entity to another specific entity. For example, identification module 104 and/or an administrator may transfer credits from one count for one user to another count for another user based on any reason or condition.

In another embodiment, determination module 106 may determine that an additional attempted action is not anomalous for the specific entity. The systems and methods described herein may allow the additional attempted action to be performed. While allowing the additional attempted action to be performed, the systems and methods herein, including performance module 108, may continue to perform security actions in response to attempts to perform anomalous actions that cause the count of anomalous actions to exceed the quota, as discussed further below.

At step 308, one or more of the systems described herein may determine that the attempted action causes a count of anomalous actions to exceed the quota of allowed anomalous actions. For example, determination module 106 may, as part of server 206 in FIG. 2, determine that the attempted action causes count 126 of anomalous actions to exceed quota 124 of allowed anomalous actions.

As used herein, the term "count" generally refers to an integer, decimal, and/or other value that corresponds to a number or amount of anomalous actions. Notably, the systems and methods described herein may modify an original integer count of anomalous actions (e.g., according to a decay function) to create a modified, integer, or fractional count, as discussed further below. For example, determination module 106 may compare the modified, fractional count with the quota to determine whether the modified, fractional count exceeds the quota. Moreover, in additional or alternative embodiments, when counting anomalous actions, determination module 106 may increase, or add to, the count in proportion to the degree to which a particular action is anomalous. As discussed above, statistical measures and other techniques may estimate the degree to which a particular action is anomalous and/or deviates from the expected level or baseline level. Accordingly, in some examples, a statistically more anomalous action may proportionally increase the count greater than a statistically less anomalous action. In general, count 126 may parallel quota 124 in form, structure, and function, such that determination module 106 may compare the two of them to each other.

In general, determination module 106 may perform a numerical comparison to determine which value is greater, the count or the quota (or whether they are equal). If determination module 106 determines that the count, if it included the new attempt to perform the action, would be greater than the quota, then determination module 106 may determine that the quota would be exceeded. In other words, the phrase "causes a count of anomalous actions to exceed" generally refers to situations where the attempted action is not actually performed but is still included within the count for purposes of performing the comparison. Accordingly, determination module 106, or another module, may notify, command, or instruct performance module 108 to perform one or more security actions, as discussed below.

In the example of FIG. 4, attempt 210 would cause count 126 to exceed quota 124. More specifically, attempt 210 would cause count 126 to increase to a count of seven. In contrast, quota 124 remains static (in this example) at six. Accordingly, determination module 106 may determine that attempt 210 would cause count 126 to exceed quota 124. In other examples, the quota may be defined according to a dynamic formula that may dynamically or continuously change the quota over time, in accordance with the changing of one or more variables or circumstances.

As mentioned above, determination module 106 may modify the count to create a modified count of anomalous actions. For example, the count of anomalous actions may be based on the application of a decay function to at least one previous anomalous action. Specifically, determination module 106 may apply a decay function to an original integer count of anomalous actions. The decay function may decrease the original count based on the length of time since one or more anomalous actions. For example, the decay function may assign a value of one to an anomalous action that occurred within the same day, but assign a value of 0.5 to an anomalous action that occurred within the last week (e.g., the week proceeding attempt 210). Examples of decay functions may include constant step decay ("1," full decay at time L), linear decay ("1−t/L"), and/or exponential decay ("exp (−t/L*log(2)"), for example. In these examples, L is a description of the rate of decay, either the time until half decay or the time until full decay in years (or any other unit of time), and k is a shape parameter.

Returning to FIG. 3, at step 310, one or more of the systems described herein may perform at least one security action based on the determination that the attempted action causes the count of anomalous actions to exceed the quota of allowed anomalous actions. For example, performance module 108 may, as part of server 206 in FIG. 2, perform at least one security action based on the determination that the attempted action causes count 126 of anomalous actions to exceed quota 124 of allowed anomalous actions.

As used herein, the term "security action" generally refers to any remedial action that a user and/or device may perform to protect a user or organization, or to otherwise prevent the loss, leaking, or compromising of data, as discussed above. In one embodiment, the security action may include one or more of: (1) blocking the attempted action, (2) network throttling, (3) revocation of access privileges, and/or (4) issuing a report to an administrator. Notably, performance module 108 may entirely block the attempted action or may only partially block the attempted action. For example, performance module 108 may inhibit the performance of the action, issue a warning, notify the user about a report issued to the administrator, slow the performance of the action, and/or place obstacles in front of performance of the action (e.g., requiring the user to perform a task, enter a password, obtain authorization, and/or any other obstacle). Performance module 108 may similarly perform any other action that helps to protect data in response to a determination that attempt 210 would cause count 126 to exceed quota 124, as discussed further above.

As explained above, the disclosed systems and methods may enable a security system to adapt to user behavior gracefully over time, without relying on rigid manual settings and configurations. Similarly, the disclosed systems and methods may help alleviate the burden on administrators in setting up, and managing, security and data loss prevention policies.

Figure 6:
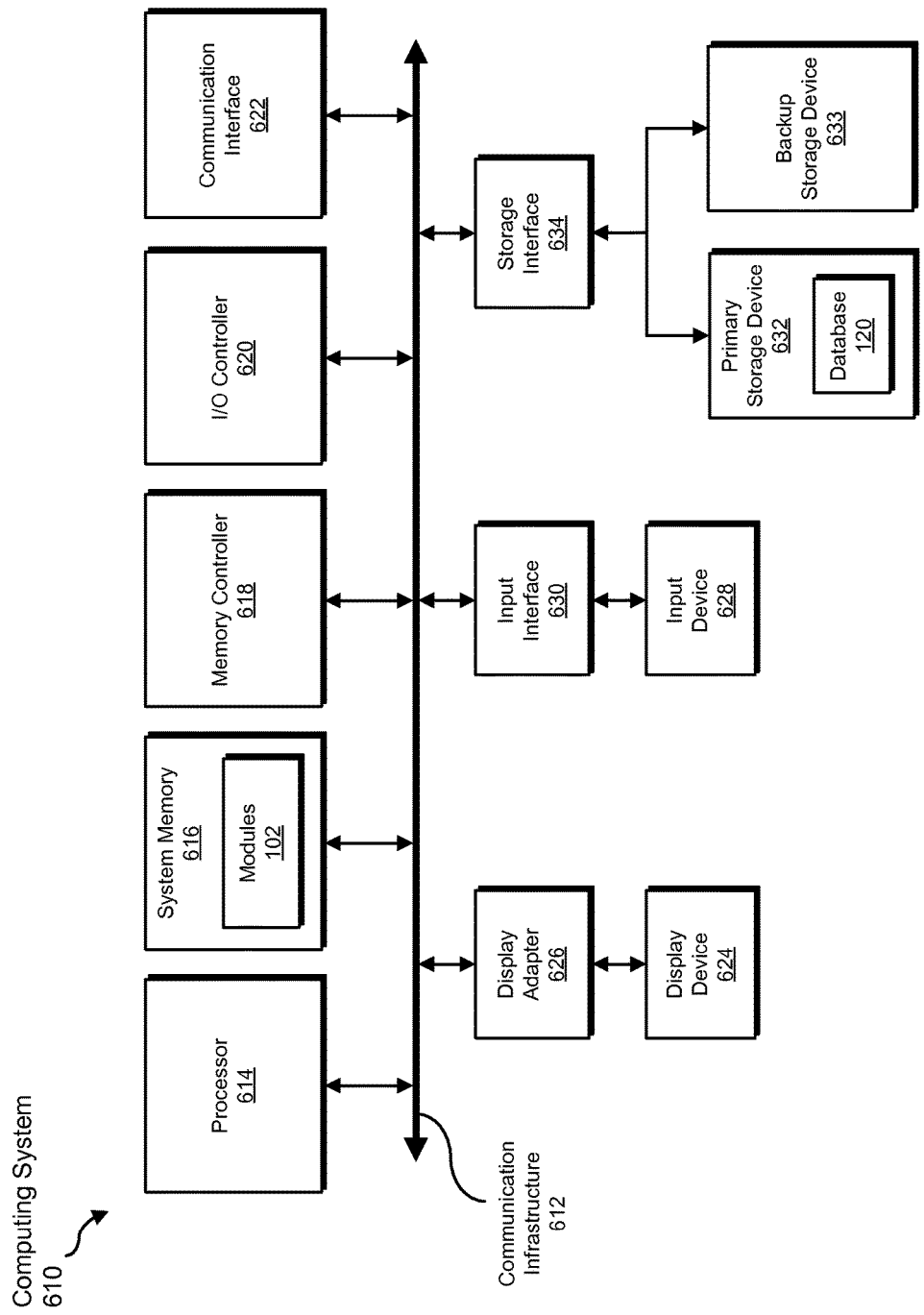
FIG. 6 is a block diagram of an exemplary computing system capable of implementing one or more of the embodiments described and/or illustrated herein.

FIG. 6 is a block diagram of an exemplary computing system 610 capable of implementing one or more of the embodiments described and/or illustrated herein. For example, all or a portion of computing system 610 may perform and/or be a means for performing, either alone or in combination with other elements, one or more of the steps described herein (such as one or more of the steps illustrated in FIG. 3). All or a portion of computing system 610 may also perform and/or be a means for performing any other steps, methods, or processes described and/or illustrated herein.

Computing system 610 broadly represents any single or multi-processor computing device or system capable of executing computer-readable instructions. Examples of computing system 610 include, without limitation, workstations, laptops, client-side terminals, servers, distributed computing systems, handheld devices, or any other computing system or device. In its most basic configuration, computing system 610 may include at least one processor 614 and a system memory 616.

Processor 614 generally represents any type or form of physical processing unit (e.g., a hardware-implemented central processing unit) capable of processing data or interpreting and executing instructions. In certain embodiments, processor 614 may receive instructions from a software application or module. These instructions may cause processor 614 to perform the functions of one or more of the exemplary embodiments described and/or illustrated herein.

System memory 616 generally represents any type or form of volatile or non-volatile storage device or medium capable of storing data and/or other computer-readable instructions. Examples of system memory 616 include, without limitation, Random Access Memory (RAM), Read Only Memory (ROM), flash memory, or any other suitable memory device. Although not required, in certain embodiments computing system 610 may include both a volatile memory unit (such as, for example, system memory 616) and a non-volatile storage device (such as, for example, primary storage device 632, as described in detail below). In one example, one or more of modules 102 from FIG. 1 may be loaded into system memory 616.

In certain embodiments, exemplary computing system 610 may also include one or more components or elements in addition to processor 614 and system memory 616. For example, as illustrated in FIG. 6, computing system 610 may include a memory controller 618, an Input/Output (I/O) controller 620, and a communication interface 622, each of which may be interconnected via a communication infrastructure 612. Communication infrastructure 612 generally represents any type or form of infrastructure capable of facilitating communication between one or more components of a computing device. Examples of communication infrastructure 612 include, without limitation, a communication bus (such as an Industry Standard Architecture (ISA), Peripheral Component Interconnect (PCI), PCI Express (PCIe), or similar bus) and a network.

Memory controller 618 generally represents any type or form of device capable of handling memory or data or controlling communication between one or more components of computing system 610. For example, in certain embodiments memory controller 618 may control communication between processor 614, system memory 616, and I/O controller 620 via communication infrastructure 612.

I/O controller 620 generally represents any type or form of module capable of coordinating and/or controlling the input and output functions of a computing device. For example, in certain embodiments I/O controller 620 may control or facilitate transfer of data between one or more elements of computing system 610, such as processor 614, system memory 616, communication interface 622, display adapter 626, input interface 630, and storage interface 634.

Communication interface 622 broadly represents any type or form of communication device or adapter capable of facilitating communication between exemplary computing system 610 and one or more additional devices. For example, in certain embodiments communication interface 622 may facilitate communication between computing system 610 and a private or public network including additional computing systems. Examples of communication interface 622 include, without limitation, a wired network interface (such as a network interface card), a wireless network interface (such as a wireless network interface card), a modem, and any other suitable interface. In at least one embodiment, communication interface 622 may provide a direct connection to a remote server via a direct link to a network, such as the Internet. Communication interface 622 may also indirectly provide such a connection through, for example, a local area network (such as an Ethernet network), a personal area network, a telephone or cable network, a cellular telephone connection, a satellite data connection, or any other suitable connection.

In certain embodiments, communication interface 622 may also represent a host adapter configured to facilitate communication between computing system 610 and one or more additional network or storage devices via an external bus or communications channel. Examples of host adapters include, without limitation, Small Computer System Interface (SCSI) host adapters, Universal Serial Bus (USB) host adapters, Institute of Electrical and Electronics Engineers (IEEE) 1394 host adapters, Advanced Technology Attachment (ATA), Parallel ATA (PATA), Serial ATA (SATA), and External SATA (eSATA) host adapters, Fibre Channel interface adapters, Ethernet adapters, or the like. Communication interface 622 may also allow computing system 610 to engage in distributed or remote computing. For example, communication interface 622 may receive instructions from a remote device or send instructions to a remote device for execution.

As illustrated in FIG. 6, computing system 610 may also include at least one display device 624 coupled to communication infrastructure 612 via a display adapter 626. Display device 624 generally represents any type or form of device capable of visually displaying information forwarded by display adapter 626. Similarly, display adapter 626 generally represents any type or form of device configured to forward graphics, text, and other data from communication infrastructure 612 (or from a frame buffer, as known in the art) for display on display device 624.

As illustrated in FIG. 6, exemplary computing system 610 may also include at least one input device 628 coupled to communication infrastructure 612 via an input interface 630. Input device 628 generally represents any type or form of input device capable of providing input, either computer or human generated, to exemplary computing system 610. Examples of input device 628 include, without limitation, a keyboard, a pointing device, a speech recognition device, or any other input device.

As illustrated in FIG. 6, exemplary computing system 610 may also include a primary storage device 632 and a backup storage device 633 coupled to communication infrastructure 612 via a storage interface 634. Storage devices 632 and 633 generally represent any type or form of storage device or medium capable of storing data and/or other computer-readable instructions. For example, storage devices 632 and 633 may be a magnetic disk drive (e.g., a so-called hard drive), a solid state drive, a floppy disk drive, a magnetic tape drive, an optical disk drive, a flash drive, or the like. Storage interface 634 generally represents any type or form of interface or device for transferring data between storage devices 632 and 633 and other components of computing system 610. In one example, database 120 from FIG. 1 may be stored in primary storage device 632.

In certain embodiments, storage devices 632 and 633 may be configured to read from and/or write to a removable storage unit configured to store computer software, data, or other computer-readable information. Examples of suitable removable storage units include, without limitation, a floppy disk, a magnetic tape, an optical disk, a flash memory device, or the like. Storage devices 632 and 633 may also include other similar structures or devices for allowing computer software, data, or other computer-readable instructions to be loaded into computing system 610. For example, storage devices 632 and 633 may be configured to read and write software, data, or other computer-readable information. Storage devices 632 and 633 may also be a part of computing system 610 or may be a separate device accessed through other interface systems.

Many other devices or subsystems may be connected to computing system 610. Conversely, all of the components and devices illustrated in FIG. 6 need not be present to practice the embodiments described and/or illustrated herein. The devices and subsystems referenced above may also be interconnected in different ways from that shown in FIG. 6. Computing system 610 may also employ any number of software, firmware, and/or hardware configurations. For example, one or more of the exemplary embodiments disclosed herein may be encoded as a computer program (also referred to as computer software, software applications, computer-readable instructions, or computer control logic) on a computer-readable medium. The phrase "computer-readable medium," as used herein, generally refers to any form of device, carrier, or medium capable of storing or carrying computer-readable instructions. Examples of computer-readable media include, without limitation, transmission-type media, such as carrier waves, and non-transitory-type media, such as magnetic-storage media (e.g., hard disk drives, tape drives, and floppy disks), optical-storage media (e.g., Compact Disks (CDs), Digital Video Disks (DVDs), and BLU-RAY disks), electronic-storage media (e.g., solid-state drives and flash media), and other distribution systems.

The computer-readable medium containing the computer program may be loaded into computing system 610. All or a portion of the computer program stored on the computer-readable medium may then be stored in system memory 616 and/or various portions of storage devices 632 and 633. When executed by processor 614, a computer program loaded into computing system 610 may cause processor 614 to perform and/or be a means for performing the functions of one or more of the exemplary embodiments described and/or illustrated herein. Additionally or alternatively, one or more of the exemplary embodiments described and/or illustrated herein may be implemented in firmware and/or hardware. For example, computing system 610 may be configured as an Application Specific Integrated Circuit (ASIC) adapted to implement one or more of the exemplary embodiments disclosed herein.

Figure 7:
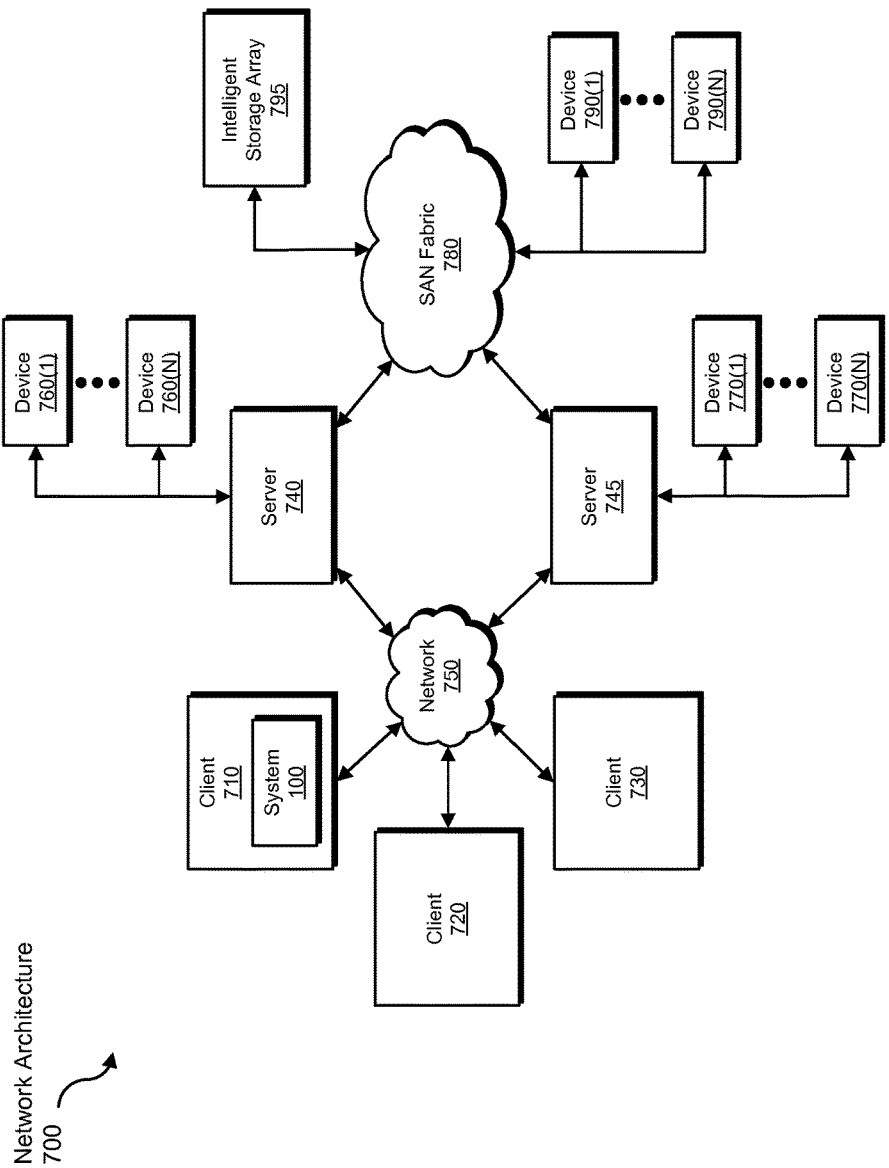
FIG. 7 is a block diagram of an exemplary computing network capable of implementing one or more of the embodiments described and/or illustrated herein.

FIG. 7 is a block diagram of an exemplary network architecture 700 in which client systems 710, 720, and 730 and servers 740 and 745 may be coupled to a network 750. As detailed above, all or a portion of network architecture 700 may perform and/or be a means for performing, either alone or in combination with other elements, one or more of the steps disclosed herein (such as one or more of the steps illustrated in FIG. 3). All or a portion of network architecture 700 may also be used to perform and/or be a means for performing other steps and features set forth in the instant disclosure.

Client systems 710, 720, and 730 generally represent any type or form of computing device or system, such as exemplary computing system 610 in FIG. 6. Similarly, servers 740 and 745 generally represent computing devices or systems, such as application servers or database servers, configured to provide various database services and/or run certain software applications. Network 750 generally represents any telecommunication or computer network including, for example, an intranet, a WAN, a LAN, a PAN, or the Internet. In one example, client systems 710, 720, and/or 730 and/or servers 740 and/or 745 may include all or a portion of system 100 from FIG. 1.

As illustrated in FIG. 7, one or more storage devices 760(1)-(N) may be directly attached to server 740. Similarly, one or more storage devices 770(1)-(N) may be directly attached to server 745. Storage devices 760(1)-(N) and storage devices 770(1)-(N) generally represent any type or form of storage device or medium capable of storing data and/or other computer-readable instructions. In certain embodiments, storage devices 760(1)-(N) and storage devices 770(1)-(N) may represent Network-Attached Storage (NAS) devices configured to communicate with servers 740 and 745 using various protocols, such as Network File System (NFS), Server Message Block (SMB), or Common Internet File System (CIFS).

Servers 740 and 745 may also be connected to a Storage Area Network (SAN) fabric 780. SAN fabric 780 generally represents any type or form of computer network or architecture capable of facilitating communication between a plurality of storage devices. SAN fabric 780 may facilitate communication between servers 740 and 745 and a plurality of storage devices 790(1)-(N) and/or an intelligent storage array 795. SAN fabric 780 may also facilitate, via network 750 and servers 740 and 745, communication between client systems 710, 720, and 730 and storage devices 790(1)-(N) and/or intelligent storage array 795 in such a manner that devices 790(1)-(N) and array 795 appear as locally attached devices to client systems 710, 720, and 730. As with storage devices 760(1)-(N) and storage devices 770(1)-(N), storage devices 790(1)-(N) and intelligent storage array 795 generally represent any type or form of storage device or medium capable of storing data and/or other computer-readable instructions.

In certain embodiments, and with reference to exemplary computing system 610 of FIG. 6, a communication interface, such as communication interface 622 in FIG. 6, may be used to provide connectivity between each client system 710, 720, and 730 and network 750. Client systems 710, 720, and 730 may be able to access information on server 740 or 745 using, for example, a web browser or other client software. Such software may allow client systems 710, 720, and 730 to access data hosted by server 740, server 745, storage devices 760(1)-(N), storage devices 770(1)-(N), storage devices 790(1)-(N), or intelligent storage array 795. Although FIG. 7 depicts the use of a network (such as the Internet) for exchanging data, the embodiments described and/or illustrated herein are not limited to the Internet or any particular network-based environment.

In at least one embodiment, all or a portion of one or more of the exemplary embodiments disclosed herein may be encoded as a computer program and loaded onto and executed by server 740, server 745, storage devices 760(1)-(N), storage devices 770(1)-(N), storage devices 790(1)-(N), intelligent storage array 795, or any combination thereof. All or a portion of one or more of the exemplary embodiments disclosed herein may also be encoded as a computer program, stored in server 740, run by server 745, and distributed to client systems 710, 720, and 730 over network 750.

As detailed above, computing system 610 and/or one or more components of network architecture 700 may perform and/or be a means for performing, either alone or in combination with other elements, one or more steps of an exemplary method for managing access.

While the foregoing disclosure sets forth various embodiments using specific block diagrams, flowcharts, and examples, each block diagram component, flowchart step, operation, and/or component described and/or illustrated herein may be implemented, individually and/or collectively, using a wide range of hardware, software, or firmware (or any combination thereof) configurations. In addition, any disclosure of components contained within other components should be considered exemplary in nature since many other architectures can be implemented to achieve the same functionality.

In some examples, all or a portion of exemplary system 100 in FIG. 1 may represent portions of a cloud-computing or network-based environment. Cloud-computing environments may provide various services and applications via the Internet. These cloud-based services (e.g., software as a service, platform as a service, infrastructure as a service, etc.) may be accessible through a web browser or other remote interface. Various functions described herein may be provided through a remote desktop environment or any other cloud-based computing environment.

In various embodiments, all or a portion of exemplary system 100 in FIG. 1 may facilitate multi-tenancy within a cloud-based computing environment. In other words, the software modules described herein may configure a computing system (e.g., a server) to facilitate multi-tenancy for one or more of the functions described herein. For example, one or more of the software modules described herein may program a server to enable two or more clients (e.g., customers) to share an application that is running on the server. A server programmed in this manner may share an application, operating system, processing system, and/or storage system among multiple customers (i.e., tenants). One or more of the modules described herein may also partition data and/or configuration information of a multi-tenant application for each customer such that one customer cannot access data and/or configuration information of another customer.

According to various embodiments, all or a portion of exemplary system 100 in FIG. 1 may be implemented within a virtual environment. For example, the modules and/or data described herein may reside and/or execute within a virtual machine. As used herein, the phrase "virtual machine" generally refers to any operating system environment that is abstracted from computing hardware by a virtual machine manager (e.g., a hypervisor). Additionally or alternatively, the modules and/or data described herein may reside and/or execute within a virtualization layer. As used herein, the phrase "virtualization layer" generally refers to any data layer and/or application layer that overlays and/or is abstracted from an operating system environment. A virtualization layer may be managed by a software virtualization solution (e.g., a file system filter) that presents the virtualization layer as though it were part of an underlying base operating system. For example, a software virtualization solution may redirect calls that are initially directed to locations within a base file system and/or registry to locations within a virtualization layer.

In some examples, all or a portion of exemplary system 100 in FIG. 1 may represent portions of a mobile computing environment. Mobile computing environments may be implemented by a wide range of mobile computing devices, including mobile phones, tablet computers, e-book readers, personal digital assistants, wearable computing devices (e.g., computing devices with a head-mounted display, smartwatches, etc.), and the like. In some examples, mobile computing environments may have one or more distinct features, including, for example, reliance on battery power, presenting only one foreground application at any given time, remote management features, touchscreen features, location and movement data (e.g., provided by Global Positioning Systems, gyroscopes, accelerometers, etc.), restricted platforms that restrict modifications to system-level configurations and/or that limit the ability of third-party software to inspect the behavior of other applications, controls to restrict the installation of applications (e.g., to only originate from approved application stores), etc. Various functions described herein may be provided for a mobile computing environment and/or may interact with a mobile computing environment.

In addition, all or a portion of exemplary system 100 in FIG. 1 may represent portions of, interact with, consume data produced by, and/or produce data consumed by one or more systems for information management. As used herein, the phrase "information management" may refer to the protection, organization, and/or storage of data. Examples of systems for information management may include, without limitation, storage systems, backup systems, archival systems, replication systems, high availability systems, data search systems, virtualization systems, and the like.

In some embodiments, all or a portion of exemplary system 100 in FIG. 1 may represent portions of, produce data protected by, and/or communicate with one or more systems for information security. As used herein, the phrase "information security" may refer to the control of access to protected data. Examples of systems for information security may include, without limitation, systems providing managed security services, data loss prevention systems, identity authentication systems, access control systems, encryption systems, policy compliance systems, intrusion detection and prevention systems, electronic discovery systems, and the like.

According to some examples, all or a portion of exemplary system 100 in FIG. 1 may represent portions of, communicate with, and/or receive protection from one or more systems for endpoint security. As used herein, the phrase "endpoint security" may refer to the protection of endpoint systems from unauthorized and/or illegitimate use, access, and/or control. Examples of systems for endpoint protection may include, without limitation, anti-malware systems, user authentication systems, encryption systems, privacy systems, spam-filtering services, and the like.

The process parameters and sequence of steps described and/or illustrated herein are given by way of example only and can be varied as desired. For example, while the steps illustrated and/or described herein may be shown or discussed in a particular order, these steps do not necessarily need to be performed in the order illustrated or discussed. The various exemplary methods described and/or illustrated herein may also omit one or more of the steps described or illustrated herein or include additional steps in addition to those disclosed.

While various embodiments have been described and/or illustrated herein in the context of fully functional computing systems, one or more of these exemplary embodiments may be distributed as a program product in a variety of forms, regardless of the particular type of computer-readable media used to actually carry out the distribution. The embodiments disclosed herein may also be implemented using software modules that perform certain tasks. These software modules may include script, batch, or other executable files that may be stored on a computer-readable storage medium or in a computing system. In some embodiments, these software modules may configure a computing system to perform one or more of the exemplary embodiments disclosed herein.

In addition, one or more of the modules described herein may transform data, physical devices, and/or representations of physical devices from one form to another. For example, one or more of the modules recited herein may receive data that indicates an attempt to perform an action, data that identifies a count of anomalous actions, and/or data that identifies a quota of allowed anomalous actions. One or more of the modules may transform any of these items of data, or copies of these items of data, using any of the methods or techniques described above. Similarly, one or more of the modules recited herein may output a result of the transformation to a storage, memory, or output device. Moreover, one or more of the modules recited herein may use a result of the transformation to protect users and organizations by preventing the loss or compromising of data. Additionally or alternatively, one or more of the modules recited herein may transform a processor, volatile memory, non-volatile memory, and/or any other portion of a physical computing device from one form to another by executing on the computing device, storing data on the computing device, and/or otherwise interacting with the computing device.

The preceding description has been provided to enable others skilled in the art to best utilize various aspects of the exemplary embodiments disclosed herein. This exemplary description is not intended to be exhaustive or to be limited to any precise form disclosed. Many modifications and variations are possible without departing from the spirit and scope of the instant disclosure. The embodiments disclosed herein should be considered in all respects illustrative and not restrictive. Reference should be made to the appended claims and their equivalents in determining the scope of the instant disclosure.

Unless otherwise noted, the terms "connected to" and "coupled to" (and their derivatives), as used in the specification and claims, are to be construed as permitting both direct and indirect (i.e., via other elements or components) connection. In addition, the terms "a" or "an," as used in the specification and claims, are to be construed as meaning "at least one of." Finally, for ease of use, the terms "including" and "having" (and their derivatives), as used in the specification and claims, are interchangeable with and have the same meaning as the word "comprising."

What is claimed is:

1. A computer-implemented method for managing access, at least a portion of the method being performed by a computing device comprising at least one processor, the method comprising:
    identifying an attempt by a user, from a set of users, to access a file within a computing environment;
    determining that the attempt to access the file is anomalous for the user according to a statistical analysis;
    identifying a quota of allowed anomalous file accesses for the user that defines a number of times the user is allowed to access files despite the access of the files being anomalous according to the statistical analysis, where the quota is assigned to the user based on a level of trust for the user and the level of trust for the user is based on at least one of:
        previous behavior of the user;
        a tenure of the user;
        a rank of the user within an organization; and
        a level of privilege previously assigned to the user within a security system;
    determining that the attempt to access the file causes a count of anomalous file accesses to exceed the quota of allowed anomalous file accesses; and
    after determining that the attempt to access the file causes the count of anomalous file accesses to exceed the quota of allowed anomalous file accesses:
        blocking the attempt to access the file; and
        permitting another action that is non-anomalous according to the statistical analysis.

2. The computer-implemented method of claim 1, wherein the quota is defined according to a dynamic formula that dynamically changes the quota over time in accordance with a changing of at least one variable.

3. The computer-implemented method of claim 1, wherein the quota specifies a number of allowed anomalous file accesses over a period of time.

4. The computer-implemented method of claim 3, wherein the period of time is defined in terms of a time of requesting to access the file.

5. The computer-implemented method of claim 3, wherein the period of time ends at a time of requesting to access the file.

6. The computer-implemented method of claim 1, wherein the level of trust for the user is based on the previous behavior of the user.

7. The computer-implemented method of claim 1, wherein determining that the attempt to access the file is anomalous for the user comprises calculating a degree to which the attempt to access the file is estimated to be anomalous.

8. The computer-implemented method of claim 7, wherein determining that the attempt to access the file is anomalous for the user further comprises determining that the calculated degree satisfies a threshold.

9. The computer-implemented method of claim 1, wherein determining that the attempt to access the file is anomalous for the user is based on at least one of:
    a statistical measure of past behavior by the user; and
    a statistical measure of past behavior by at least one other user that is compared to the user.

10. The computer-implemented method of claim 1, wherein the quota of allowed anomalous file accesses comprises a global quota that applies to the entire set of users.

11. The computer-implemented method of claim 1, further comprising allowing the other action to be performed while continuing to block attempts to access files that cause the count of anomalous file accesses to exceed the quota.

12. The computer-implemented method of claim 1, further comprising at least one of:
    network throttling;
    revocation of access privileges; and
    issuing a report to an administrator.

13. The computer-implemented method of claim 1, further comprising modifying the count by transferring credits.

14. The computer-implemented method of claim 1, wherein:
    the quota specifies a number of allowed anomalous file accesses as a specific category of actions; and
    an additional quota is assigned to the user for a different category of actions.

15. The computer-implemented method of claim 1, wherein the count of anomalous file accesses is based on application of a decay function applied to at least one previous anomalous action.

16. A system for managing access, the system comprising:
    an identification module, stored in memory, that identifies an attempt by a user, from a set of users, to access a file within a computing environment;

a determination module, stored in memory, that determines that the attempt to access the file is anomalous for the user according to a statistical analysis, wherein:
the identification module identifies a quota of allowed anomalous file accesses for the user that defines a number of times the user is allowed to access files despite the access of the files being anomalous according to the statistical analysis, where the quota is assigned to the user based on a level of trust for the user and the level of trust for the user is based on at least one of:
 previous behavior of the user;
 a tenure of the user;
 a rank of the user within an organization; and
 a level of privilege previously assigned to the user within a security system;
the determination module determines that the attempt to access the file causes a count of anomalous file accesses to exceed the quota of allowed anomalous file accesses;
the system further comprises:
a performance module, stored in memory, that, after determining that the attempt to access the file causes the count of anomalous file accesses to exceed the quota of allowed anomalous file accesses:
 blocks the attempt to access the file; and
 permits another action that is non-anomalous according to the statistical analysis; and
at least one physical processor configured to execute the identification module, the determination module, and the performance module.

17. The system of claim 16, wherein the quota is defined according to a dynamic formula that dynamically changes the quota over time in accordance with a changing of at least one variable.

18. The system of claim 16, wherein the quota specifies a number of allowed anomalous file accesses over a period of time.

19. The system of claim 18, wherein the period of time is defined in terms of a time of requesting to access the file.

20. A non-transitory computer-readable medium comprising one or more computer-readable instructions that, when executed by at least one processor of a computing device, cause the computing device to:
 identify an attempt by a user, from a set of users, to access a file within a computing environment;
 determine that the attempt to access the file is anomalous for the user according to a statistical analysis;
 identify a quota of allowed anomalous file accesses for the user that defines a number of times the user is allowed to access files despite the access of the files being anomalous according to the statistical analysis, where the quota is assigned to the user based on a level of trust for the user and the level of trust for the user is based on at least one of:
  previous behavior of the user;
  a tenure of the user;
  a rank of the user within an organization; and
  a level of privilege previously assigned to the user within a security system;
 determine that the attempt to access the file causes a count of anomalous file accesses to exceed the quota of allowed anomalous file accesses; and
 after determining that the attempt to access the file causes the count of anomalous file accesses to exceed the quota of allowed anomalous file accesses:
  block the attempt to access the file; and
  permit another action that is non-anomalous according to the statistical analysis.

* * * * *